United States Patent [19]

Lindemann et al.

[11] Patent Number: 4,683,165

[45] Date of Patent: *Jul. 28, 1987

[54] BINDER FOR FIBERS OR FABRICS

[75] Inventors: Martin K. Lindemann, Greenville; Kim Deacon, Rockhill, both of S.C.

[73] Assignee: Sun Chemical Corporation, New York, N.Y.

[ * ] Notice: The portion of the term of this patent subsequent to Oct. 10, 2003, has been disclaimed.

[21] Appl. No.: 902,696

[22] Filed: Sep. 2, 1986

Related U.S. Application Data

[63] Continuation-in-part of Ser. No. 753,685, Jul. 10, 1985, Pat. No. 4,616,057.

[51] Int. Cl.$^4$ ............................................. B32B 27/00
[52] U.S. Cl. .................................................. 428/290
[58] Field of Search ........................................ 428/290

[56] References Cited

U.S. PATENT DOCUMENTS 3,732,184  5/1978  Lindemann et al. .................. 526/87
4,119,746  10/1978  Bleyle ................................. 524/458

Primary Examiner—Joseph L. Schofer
Assistant Examiner—N. Sarofim
Attorney, Agent, or Firm—Mitchell D. Bittman

[57] ABSTRACT

A non-woven product is prepared in which a fiber or fabric is bound by a binder containing an aqueous copolymer emulsion which contains a first polymer network which is intertwined on a molecular scale with a second polymer network.

18 Claims, No Drawings

BINDER FOR FIBERS OR FABRICS

RELATED APPLICATIONS

This application is a continuation-in-part of copending application Ser. No. 753,685, filed July 10, 1985, now U.S. Pat. No. 4,616,057.

BACKGROUND OF THE INVENTION

This invention relates to a process for preparing a polymer emulsion containing colloidally suspended therein an interpenetrating polymer network wherein a first polymer network is intertwined on a molecular scale with a second polymer network and optionally additional polymer networks. The polymer emulsion of this invention is useful as binder of fibers or fabrics, especially fiberfill.

Fiberbill is a generic term used to describe a variety of nonwoven fabrics for a variety of end uses. The common feature of all fiberfill products is a measure of loft or thickness in the fabric. This loft is a characteristic of value because it imparts insulation to outerwear and bed quilt stuffing, cushioning in furniture padding, dust holding capacity to filter media and resiliency to scrubbing pads. The most common construction of a fiberfill product is a loosely garnetted, cross-lapped or air laid web of 6 to 30 denier polyester staple fibers which is bonded (locked in its particular fiber arrangement) by an emulsion polymer binder. Fiberfill products can be made with other fibers, e.g. polyamide, cellulose acetate, rayon, glass, alone or in blends with each other. Some fiberfill is sold without a bonding agent but the material will lack durability, tensile strength and resiliency when compared to a bonded product. Bonding methods other than emulsion polymers, such as needle punching, and meltable fibers and powders are also used, but the polymer emulsion method produces the optimum strength/loft ratios for the majority of fiberfill markets.

The polymer emulsion product used as the binder is usually one of the following chemical types: polyvinylacetate, acrylic copolymers, styrene-butadiene copolymers or polyvinylchloride. Polyvinylacetate is the most common binder and in recent years it has been made white enough and strong enough to replace most of the acrylic polymer traditionally used. Polyvinylchloride is used where flame resistance is of prime concern and styrene-butadiene copolymers are used for special rubbery applications.

The characteristic of initial loft is unaffected by the chemical type of the binder used. However, initial loft is not the loft of value. Fiberfill products in their normal use are compressed, reducing the initial loft, and released many times. The true value of loft is how thick the fiberfill web is after repeated compression/recovery cycles. One drawback of current polymer bonded fiberfill technology is that temperatures over 100° F. will soften the binder and cause the fiberfill product to permanently lose loft if it is compressed at this elevated temperature. Temperatures of up to 180° F. are encountered in the shipping and use of many fiberfill products. Typically a fiberfill product, which may lose only 15% of its initial loft if compressed and released at 80° F., will lose more than 80% of its loft if tested the same way at only 120° F. Higher temperatures are expected to even more dramatically damage this loft recovery.

Another area in which polymer binders are useful is in the manufacture of glass fiber mats. Nonwoven fiber mats made from glass staple fibers are finding uses in many markets. The attributes of glass fiber include non-combustibility, inertness to aqueous and most solvent environments, high tensile strength per unit weight, among others, which have led to glass fiber use in building products (e.g. roofing materials, insulation, and flooring), home furnishings, protective apparel and fabrics, and filtration materials. Glass fiber mats are used alone (as in insulation or filtration constructions) in conjunction with other fabrics (as in drapery or apparel constructions) or as part of an intimate joining with other materials (as in roofing shingles or vinyl flooring). In any of these ultimate uses the strength and integrity of the glass fiber mat is very important to the successful performance of the finished article.

Glass fibers themselves are known for their high tensile strength and inertness to reaction with other materials. Since they are generally not available in crimped form, these features make bonding the glass fiber mats into integral networks of adequate strength, flexibility and toughness a difficult task. This bonding is customarily accomplished with polymer emulsions or other thermosetting resins such as urea formaldehyde, malamine formaldehyde and phenol formaldehyde resins and the like.

Insulation products require a maximum dead air space per unit weight. This must not only be achievable in the initial production, but be retained after the insulation product has been compressed for storage and shipment and subsequently placed in service as insulation in a building or machinery construction. The binding chemical in this case must not distort or deform in various handling operations. To date, urea-formaldehyde resins have provided this binding function most economically.

Nonwoven fabrics cover a wide array of products including consumer goods like mattress dust shields, disposable diaper cover fabrics, cleaning towels, carpets, draperies and industrial and commercial goods like wipe cloths, tire cords, conveyor belts, hospital fabrics, etc. The ability to engineer cost-effective fabrics through one or several nonwoven production processes have allowed for rapid growth of nonwoven textiles in recent years. The technology for nonwoven production includes filament or staple filters processed through a dry or wet-lay sheet formation step and bonded by thermal, mechanical or chemical means. Laminations of nonwovens to other nonwovens, film sheets or traditional woven or knitted textiles are often still classified as nonwovens.

One of the major nonwoven bonding methods is to treat a staple or filament fiber sheet with an emulsion polymer. When the emulsion is dried or otherwise reduced (coacervation) the polymer forms intimate bonding of the fibers. This polymer deposition modifies the strength, stiffness, environmental resistance, elongation and many other characteristics of the fiber fabric sheet. The fiber can be from a great variety of compositions, e.g. rayon, wood pulp (cellulose), cotton, nylon, polyester, glass and graphite. In the case of carded staple fiber the polymer usually contributes most of the strength and toughness character in the resulting nonwoven. In wet-laid wood pulp fiber products the polymer is able to provide the nonwoven with strength and resistance to aqueous and solvent environments which the untreated nonwoven would not have. In glass mat nonwovens traditionally bonded with a urea-formaldehyde resin, addition of emulsion polymers alters the toughness of the resulting nonwoven. Even in filament or staple fiber nonwovens which are bonded by mechanical (i.e. needle punching) or thermal (e.g. spun bonded) techniques and are formed into useful nonwoven fabrics without a chemical treatment, an additional application of an emulsion polymer can enhance or produce other valuable characteristics such as stretch resistance or non-slip character.

A great variety of emulsion polymers have been used to treat nonwovens. Traditional polymer compositions have been based on: acrylate and methacrylate ester copolymers; styrene-acrylate ester copolymers; styrene-butadiene copolymers; acrylonitrile copolymers of the above; vinylacetate polymers; vinylacetate-acrylate ester polymers; vinylacetate-ethylene copolymers; vinyl chloride polymers; vinyl chloride-ethylene copolymers and vinyl chloride-acrylate ester copolymers. All the above emulsion polymers have found use in nonwoven fabrics based primarily on the particular characteristics which the polymer can contribute to the nonwoven. Some are used because they simply contribute strength at the lowest cost level. Particular examples include (1) the use of an acrylate ester copolymer to bond polyester staple fiber for quilt stuffing and insulation; (2) the use of a vinylacetate-ethylene copolymer to give wet strength to wood pulp nonwovens used as paper towels; (3) the use of a vinylchloride based polymer to bond staple polyester fibers for flame retardant filter media; and (4) the use of a styrene-butadiene copolymer to bond high denier nylon fibers for extra tough floor polishing fabrics.

The polymer emulsion prepared by the process of this invention provides a binder compound for fiberfill which provides improved resiliency and loft recovery to the bonded fiberfill products. This polymer emulsion is useful in bonding textile fibers in a fiberfill product or in any nonwoven product or even any traditional woven or knitted textile fabric. The polymer emulsion can also be used as a binder of fabric or fibers for other nonwoven products including insulation, filters, construction fabrics, roofing materials, paper towels, carpets as well as other nonwoven fabrics.

SUMMARY OF THE INVENTION

Briefly, the present invention provides a process for preparing a polymer emulsion containing an interpenetrating polymer network by forming a first polymer emulsion, mixing a second monomer emulsion with the first polymer emulsion, allowing the emulsion mixture to equilibrate and polymerizing the emulsion mixture providing a first polymer network which is intertwined on a molecular scale with the second polymer network. This polymer emulsion is useful in non-woven products as a binder for fiber or fabric, specifically as a binder for a glass fiber non-woven mat.

DETAILED DESCRIPTION OF THE INVENTION

The aqueous polymer emulsion containing an interpenetrating polymer network is prepared by forming a first polymer emulsion. The first polymer emulsion can be prepared by conventional batch, semi-continuous or continuous polymerization procedures. These are taught, for example in U.S. Pat. Nos. 2,754,280, 2,795,564, 3,732,184 and in the book entitled "The Applications of Synthetic Resin Emulsion" by H. Warson, Ernest Benn Limited, London, 1972, pp. 85 to 132. The first polymer emulsion can be formed by polymerizing a monomer or a mixture of monomers (herein called a first monomer) with an active crosslinking agent. Alternatively the first polymer emulsion can be formed by emulsifying a polymer. Examples of emulsified polymers include polyethylene emulsions, polyester emulsions, polyurethane emulsions and the like.

The first polymer emulsion is mixed with a second monomer emulsion and then the emulsion mixture is allowed to equilibrate. By equilibration is meant allowing sufficient time for the second monomer to become adsorbed into the first polymer. The mixing and equilibration allows the second monomer emulsion to be thoroughly mixed and dispersed throughout the first polymer emulsion on a molecular scale. The second monomer emulsion can be added either as an emulsion or as a monomer or mixture of monomers which will emulsify during mixing with the first polymer emulsion.

Then, after thorough mixing and equilibration the emulsion mixture is polymerized providing a first polymer network which is intertwined on a molecular scale with the second polymer network, i.e. an interpenetrating polymer network is formed. Optionally, a third monomer emulsion can then be mixed in, equilibrated, followed by polymerization or further additional monomer emulsions can likewise be intertwined in the polymer networks. When the polymer emulsion is subsequently applied, dried and heated the physical and chemical bonding of the first polymer network with the second polymer network is completed.

Because of the interpenetrating network formed, desirable physical properties are achieved. Dual Tg (glass transition temperature) properties have been observed wherein the polymer has the Tg of both the first polymer and the second polymer. This is especially useful in the application of the polymer emulsion wherein modulus, tensile strength and desirable film forming properties can be adjusted by varying the ratio of the first and second polymers comprised in the interpenetrating network. Because the first and second networks are intertwined on a molecular scale higher tensile strength has been observed as well as higher modulus and higher impact strength at temperatures intermediate the Tg's of the first polymer and the second polymer.

The monomers which are polymerized in accordance with the present invention are vinyl monomers, ethylenically unsaturated compounds. Examples of monoethylenically unsaturated monomers are: vinyl esters of alkanoic acids having from 1 to about 18 carbon atoms, such as vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl ester (e.g. Versatic Acid TM, a branched carboxylic acid, marketed by the Shell Oil Corporation), vinyl laurate, and vinyl stearate; also alpha-olefins, such as ethylene, propylene, butylene, isobutylene, and pentene and the like; also maleate, fumarate, and itaconate esters of $C_1$–$C_8$ alcohols, such as dibutyl maleate, dibutyl fumarate, dibutyl itaconate; also alkyl acrylates with an alkyl group having from 1 to 18 carbon atoms, such as methyl, ethyl, n-butyl, sec-butyl, the various isomeric pentyl, hexyl, heptyl, and octyl (especially 2-ethylhexyl), lauryl, cetyl, stearyl and like groups; also alkyl esters of methacrylic acid with an alkyl group having from 1 to about 18 carbon atoms, such as methyl, ethyl, propyl, n-butyl, n-hexyl, 2-ethylhexyl, n-octyl, lauryl, cetyl, stearyl and like groups; also vinyl alkyl ethers, having an alkyl group with 1 to 18 carbon atoms, such as methyl vinyl ether, ethyl vinyl ether, butyl vinyl ether and stearyl vinyl ether. Examples of monomers also include diene monomers, such as butadiene, chloroprene, and isoprene and similar compounds. Other monomers include aromatic vinyl monomers, such as styrene, alphamethylstyrene, vinyl toluene, 2-bromostyrene, and p-chlorostyrene; also acrylonitrile; also vinyl halide monomers, such as vinyl chloride and vinylidene chloride; also benzyl acrylate and t-butyl acrylate; also vinyl esters of aromatic acids, such as vinylbenzoate.

Preferably the polymer present in the first polymer emulsion is either polymethyl methacrylate, polyvinyl acetate, polybutylacrylate, vinylchloride-ethylene copolymer, vinylacetate-ethylene copolymer, polystyrene or polyacrylo-nitrile or copolymers of these with other monomers mentioned above, while the second polymer differs from the first polymer and preferably is based upon a monomer such as acrylo-nitrile, methyl methacrylate, butylacrylate, styrene or mixtures thereof.

In order to obtain desirable dual Tg properties, the polymer in the first polymer emulsion and the polymer derived from the second monomer emulsion can be chosen so, for example, one has a Tg greater than the other. Different pairs of polymers can be chosen to exhibit useful properties over different temperature ranges. For example, because of polystyrene's higher Tg, upon interpenetrating a polyvinyl acetate network it will extend the modulus and reduce distortion of the matrix at elevated temperatures.

In general, the various combinations of monomers can be chosen for the first polymer emulsion or the second monomer emulsion. However, the monomer chosen for the first monomer emulsion cannot be an inhibitor to or retard the polymerization of the monomer in the second monomer emulsion. Since acrylonitrile is an inhibitor to the polymerization of vinyl acetate, the vinyl acetate must be in the first polymer emulsion while the acrylo-nitrile is in the second monomer emulsion. Thus, in a preferred embodiment, the first polymer emulsion contains polyvinyl acetate, vinylacetate-ethylene copolymer, or vinylacetate-butylacrylate copolymer, while the second monomer emulsion contains either styrene, methyl methacrylate, acrylonitrile or butylacrylate, or mixtures therof.

The process of the present invention provides an interpenetrating network of polymers which are generally physically incompatible in that the polymers are not soluble in one another. In addition, this process provides a means of combining polymers which cannot normally be formed by copolymerization of their monomers. For example, vinyl acetate and styrene cannot generally be copolymerized and mixing or blending of the two polymers in emulsion form does not result in a polymer having desirable properties (e.g. poor tensile strength).

The first polymer emulsion and optionally the second monomer emulsion contain an active crosslinking agent. By the term "active crosslinking agent" is meant a functional monomer which immediately provides crosslinking and branching of the polymer during the initial formation of the emulsion polymer (i.e. during the polymerization step) to increase the molecular weight of the emulsion polymer. Subsequent drying or other curing techniques are not required for the crosslinking and branching of the emulsion polymer by the active crosslinking agent. Monomers of this type generally comprise compounds which contain 2 to 5 ethylenically unsaturated groups in one molecule separated by an ester or ether group, or by an aromatic or nitrogenous ring structure, where the unsaturated groups are capable of undergoing addition polymerization by free radical means. Suitable active crosslinking agents include alkylene glycol diacrylates and methacrylates, such as ethylene glycol diacrylate, 1,3-butylene glycol diacrylate, propylkene glycol diacrylate, triethylene glycol dimethacrylate etc., 1,3-glycerol dimethacrylate, 1,1,1-trimethylol propane dimethacrylate, 1,1,1-trimethylol ethane diacrylate, pentaerythritol trimethacrylate, sorbitol pentamethacrylate, methylene bismethacrylamide, divinyl benzene, vinyl methacrylate, vinyl crotonate, vinyl acrylate, divinyl adipate; also di- and tri-allyl compounds, such as triallyl cyanurate, triallyl isocyanurate, diallyl phthalate, allyl methacrylate, allyl acrylate, diallyl maleate, diallyl fumarate, diallyl itaconate, diallyl malonate, diallyl carbonate, triallyl citrate, triallyl aconitate; also divinyl ether, ethylene glycol divinyl ether and the like. The amount of active crosslinking agent in the polymer emulsion of the present invention is from about 0.01 to 0.5 percent, preferably from about 0.05 to 0.25 percent by weight of the polymer.

The first polymer emulsion or the second monomer emulsion, preferably both, additionally contain a latent crosslinking agent. By the term "latent crosslinking agent" is meant a polyfunctional monomer wherein a portion of the functionality enters into the polymerization with other monomers in the polymer emulsion, with the residual functionality causing crosslinking of the polymer upon the subsequent application of energy generally by applying heat, e.g. by drying and curing of the latex particles, often in the presence of a catalyst, or by applying radiation. The latent crosslinking agent provides thermosetting characteristics to the polymer emulsion. Upon the subsequent application of energy the latent crosslinking agent forms an insoluble crosslinking network, with the crosslinking being triggered generally by heat or radiation after the polymer emulsion has been formed and applied. Examples of latent crosslinking agents are: N-alkylolamides of alpha, beta ethylenically unsaturated carboxylic acids having 3–10 carbons, such as N-methylol acrylamide, N-ethanol acrylamide, N-propanol acrylamide, N-methylol methacrylamide, N-ethanol methacrylamide, N-methylol malemide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1–8 carbon atoms, such as N-(methoxymethyl) acrylamide, N-(butyoxymethyl) acrylamide, N-(methoxymethyl) methacrylamide; N-methylol allyl carbamate and the N-alkoxymethyl derivatives such as N-(butoxymethyl) allyl carbamate and N-(methoxymethyl) allyl carbamate and the like, and mixtures of these monomers with allyl carbamate, acrylamide or methacrylamide. Epoxy containing monoethylenically unsaturated compounds, such as glycidyl acrylate, glycidyl methacrylate and vinyl glycidyl ether function as latent crosslinking monomers often in conjunction with mono- and diethylenically unsaturated carboxylic acids, such as acrylic, methacrylic and itaconic acid, when catalyzed with an alkaline catalyst, such as potassium or sodium carbonate, diethylenetriamine and the like. Hydroxyethyl acrylate, hydroxypropyl acrylate and the corresponding methacrylates provide latent crosslinking when combined with N-alkylolamides of alpha, beta ethylenically unsaturated acids having 3-10 carbon atoms or with the acids themselves by ester formation. Another group of latent crosslinking monomers is described in U.S. Pat. Nos. 3,678,098 and 4,009,314. These are cationic chlorohydrin compounds having the following formula:

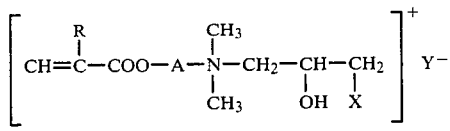

where  R = methyl or H
A = alkylene
X,Y = halogen

The crosslinking reaction of these monomers is also catalyzed by the alkaline compounds mentioned above. The amount of latent crosslinking agent in the polymer of the present invention is about from 0.5 to 10 percent, preferably from about 2 to 6 percent by weight of the polymer.

The emulsions of the present invention are prepared in the presence of suitable anionic, cationic or nonionic emulsifiers or mixtures thereof. Optionally, protective colloids, illustrated by polyvinyl alcohol and hydroxyethyl cellulose, may also be present. Suitable nonionic emulsifying agents include alkylphenoxypolyethoxyethanols having alkyl groups of about 7 to 18 carbon atoms and 10 to 60 or more oxyethylene units, such as octylphenoxypolyethoxyethanols, methyloctylphenoxypolyethoxyethanols, nonylphenoxypolyethoxyethanols, dodecylphenoxypolyethoxyethanols; also ethylene oxide derivatives of long chained carboxylic acids, such as lauric, myristic, palmitic, oleic, and stearic acid, containing 10 to 60 oxyethylene units per molecule; also analogous ethylene oxide condensates of long-chained alcohols, such as octyl, decyl, lauryl, stearyl and cetyl alcohols, ethylene oxide derivatives of etherified or esterified polyhydroxy compounds having a hydrophobic component, such as lauric, myristic, palmitic, oleic, and stearic acid, containing 10 to 60 oxyethylene units per molecule; also analogous ethylene oxide condensates of long-chained alcohols, such as octyl, decyl, lauryl, stearyl, and cetyl alcohols, ethylene oxide derivatives of etherified or esterified polyhydroxy compounds having a hydrophobic hydrocarbon chain, such as sorbitan monostearate containing 10 to 60 oxyethylene units; also block copolymers of ethylene oxide and propylene oxide comprising a hydrophobic propylene oxide section combined with one or more hydrophilic ethylene oxide sections. Suitable anionic emulsifying agents include higher fatty alcohol sulfates, such as sodium lauryl sulfate, the alkylaryl sulfonates, such as the sodium salt of t-octylphenyl sulfonate, the sodium dioctyl sulfosuccinates, disodium fatty alkyl alkanolamide sulfosuccinate, and the ammonium salt of a sulfate or phosphate ester of an alkylphenoxy poly(ethyleneoxy)ethanol, where the oxyethylene content is from 3 to 30 moles per alkylphenol. Suitable cationic emulsifiers include N-dodecyl trimethyl ammonium chloride, and N-vinyl benzyl trimethyl ammonium chloride and the like. Generally, the polymer emulsions of this invention contain from 1 to 10 percent, preferably from 3 to 6 percent, emulsifiers based on the weight of the monomers (solids).

In the polymerization process used in making the first polymer emulsion of the invention an aqueous phase is prepared first containing water, a small portion of a nonionic emulsifier, sometimes also a mixture of anionic and nonionic emulsifiers, and a very small amount of ferrous sulfate, being a redox component in the catalyst system or the finishing catalyst system for the polymer emulsion. The aqueous phase is purged well with nitrogen, and heated to polymerization temperatures (e.g. 40° to 70° C.). A small portion of monomer (and redox component for certain systems such as vinylacetate-ethylene copolymer), is then added followed by a suitable amount of initial catalyst, most often from about 1 to 3 percent based on the weight of the initial monomer charge. Often it is advantageous to use potassium persulfate as the catalyst because the resulting polymer has better resistance to heat discoloration. But sodium or ammonium persulfates can also be used. After the emulsion polymerization has initiated, the rest of the monomers are gradually added to the reaction mixture, often emulsified in water together with the latent crosslinking agents and the active crosslinking agents. Generally, the gradual addition of the monomers is carried out over a time period of one to five hours. More catalyst solution (and redox component in certain systems) is also added gradually to maintain the polymerization reaction. Often cooling is applied to the reaction vessel by means of a waterbath to remove the excess heat of polymerization. Usually, a total of 0.2 to 1 percent of catalyst (and 0.2 to 1% of redox component in certain systems) based on the weight of the monomers, is added over the course of the emulsion polymerization. After all the monomer has been added optionally a small amount of an organic peroxide, such as t-butyl hydroperoxide and cumene hydroperoxide, and the like can be added for the finishing step, together with a small amount of a reducing agent, such as sodium metabisulfate, sodium formaldehyde sulfoxylate, zinc formaldehyde sulfoxylate and ascorbic acid. In place of an organic peroxide, hydrogen peroxide or persulfates, such as potassium, sodium or ammonium persulfates may also be used. The terminal catalyst necessary to finish the reaction is generally about 10 to 30 percent by weight of the total amount of catalyst consumed during the reaction. The reducing agent is ordinarily added in the necessary equivalent amount. Normally no buffering agent is required to keep the pH between 3 and 5. If necessary, dilute ammonia or a dilute solution of sodium acetate or sodium bicarbonate may be added from time to time to adjust the pH within those limits. Others auxiliary agents may be added to the finished polymer emulsion, such as defoamers, biocides and the like.

After the first polymer emulsion is cooled a second monomer or mixture of monomers is introduced into the reactor as fast as possible. The second monomer can either be added as an emulsion to the first polymer emulsion or as monomers which are emulsified during mixing with the first polymer emulsion. Water, emulsifier and a small amount of ferous sulfate (redox component) are also added either with the second monomer or after equilibration.

Following thorough mixing and equilibration (e.g. 10 to 60 minutes) of the first polymer emulsions and second monomer emulsions a second polymerization step is initiated by the addition of catalyst solution and then the reducing solution.

The polymer emulsion of this invention generally contains from 5 to 95%, preferably 30 to 90% on a solids by weight basis of the first polymer emulsion and preferably 10 to 70% on a solids by weight basis of the second polymer emulsion.

The polymer emulsions of the present invention are useful as binders, adhesives and coatings. These polymer emulsions when used as binders provide high temperature resiliency to bonded fiberfill products. The polymer emulsions are useful in bonding textile fibers in a fiberfill product or other nonwoven product or even in traditional woven or knitted textile fabrics. Generally, based on the weight of the fiberfill or non-woven product the binder can comprise 2 to 50%.

The polymer emulsions are also useful as binders for a wide array of nonwoven products including insulation, filters, construction fabrics, roofing materials, paper towels, carpets and other nonwoven fabrics. These binders can also contain thermosetting resins such as urea-formaldehyde resins, glioxal resins, melamine resins and phenol formaldehyde resins, as well as wetting agents (surfactants such as polyethyleneoxideoctylphenol), colorants (pigments such as phthalocyanine blue), defoamers (oil emulsions), foam aids (e.g. sodium lauryl sulphate), biocides, as well as extenders (e.g. calcium carbonate, clay, kaolin, etc.) and other specialty performance additives (e.g. silicon emulsions for friction control).

EXAMPLE 1

A polymer emulsion is prepared as follows containing a polymer which is an interpenetrating network of polyvinyl acetate and polystyrene.

The following was charged to a 100 gal. (379 liter) stainless steel pilot reactor equipped with a variable agitator, temperature control system, feedpumps, means for purging the reactor with nitrogen, and a jacket for heating and cooling:

| Water | 140 lbs. (63.5 kg) |
| --- | --- |
| Triton X 305 (1) | 6 lbs. 10 oz. (3 kg) |
| Emcol K8300 (2) | 8 oz. (227 g) |

The contents of the reactor were heated to 67° C. after which the reactor was purged with nitrogen. After the heat-up and purge the following monomer was added to the reactor:

| Vinyl acetate | 26 lbs. (11.8 kg) |
| --- | --- |

This was followed by the addition of the initial catalyst solution:

| Water | 10 lbs. (4.5 kg) |
| --- | --- |
| Potassium persulfate | 8 oz. (227 g) |

The polymerization initiated within 5 minutes as indicated by a 2° C. rise in temperature of the reactor. The following first monomer emulsion, made up previously, was then added gradually by means of an addition pump at a rate of 1.56 lbs. (0.71 kg)/minute over a 3½ hour period:

| Water | 58 lbs. (26.3 kg) |
| --- | --- |
| Emcol K8300 (2) | 8 lbs. 8 oz. (3.9 kg) |
| Triton X 305 (1) | 2 lbs. 4 oz. (1.0 kg) |
| N—Methylol acrylamide (49%) | 19 lbs. (8.6 kg) |
| Acrylamide (50%) | 2 lbs. (0.9 kg) |
| Monoethylmaleate | 12 oz. (340 g) |
| JPS Sequesterent (5) | 5 oz. (142 g) |
| Vinyl acetate | 238 lbs. (108 kg) |
| Triallyl cyanurate | 5 oz. (142 g) |

The temperature of the reactor content was allowed to rise to 80° C. and was maintained there by the gradual addition at a rate of 0.362 lbs. (0.164 kg)/minute over a 3½ hour period of the following catalyst solution:

| Water | 75 lbs. (34 kg) |
| --- | --- |
| Potassium persulfate | 9 oz. (255 g) |

After 3½ hours, when all the first monomer emulsion and catalyst solution had been added to the reactor the following finishing catalyst solution was added:

| Water | 1 lb. (.45 kg) |
| --- | --- |
| Potassium persulfate | 2 oz. (57 g) |

The temperature of the batch was maintained at 80° C. for an additional 30 minutes, after which the first polymer emulsion was cooled to 60° C. At this point a second monomer emulsion was introduced into the reactor, as fast as possible, in about 10 minutes, and mixed with the first polymer emulsion. The second monomer emulsion had been prepared before containing:

| Water | 50 lbs. (22.7 kg) |
| --- | --- |
| Emcol K8300 (2) | 3 lbs. (1.4 kg) |
| Triton X 305 (1) | 3 lbs. (1.4 kg) |
| N—Methylol acrylamide (49%) | 5 lbs. (2.3 kg) |
| Styrene | 100 lbs. (45.4 kg) |
| Ferrous sulfate | 1 gram |

The temperature of the reactor content was maintained at 60° C. and allowed to equilibrate (½ hour) while the reactor was again purged with nitrogen after which the following catalyst solution was added to the reactor:

| Water | 19 lbs. (8.6 kg) |
| --- | --- |
| Potassium persulfate | 1 lb. (0.5 kg) |
| t-butyl hydroperoxide | 8 oz. (227 g) |

The second polymerization step was initiated by adding half of the following reducing solution:

| Water | 16 lbs. (7.3 kg) |
| --- | --- |
| Hydrosulfite AWC (3) | 6 oz. (170 g) |

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

| Water | 4 lbs. (1.8 kg) |
| --- | --- |
| Zinc nitrate solution in water (50%) | 14 oz. (397 g) |

-continued

| | |
|---|---|
| Phosphoric acid | 7 oz. (198 g) | followed by a second post-add as follows:

| | |
|---|---|
| Water | 2 lbs. (0.9 kg) |
| Proxel GXL (4) | 1½ oz. (43 g) |
| Formaldehyde (37%) | 1½ oz. (43 g) |

A total of 55 lbs. (24.9 kg) of rinsewater was added to the emulsion for clean up of the pumps and lines.

Notes:
(1) Triton X 305 is a 70 percent solution in water of an octylphenoxypolyethoxyethanol containing 30 moles of oxyethanol per mole of octyl phenol. It is supplied by the Rohm & Haas Company.
(2) Emcol K8300 is a 40 percent solution in water of disodium fatty alkyl alkanolamide sulfosuccinate supplied by the Witco Chemical Company.
(3) Hydrosulfate AWC is a brand of sodium formaldehyde sulfoxylate supplied by the Diamond Shamrock Company.
(4) Proxel GXL is a biocide supplied by the ICI Company.
(5) JPS Sequesterant is a brand of diethylenetriamine pentaacetic acid supplied by the Intex Products Company.

The polymer emulsion thus obtained had the following properties:

| | |
|---|---|
| solids (30 min. at 130° C. drying) | 46.3% |
| pH | 3.5 |
| viscosity (Brookfield at 50 RPM) | 78 cps |
| intrinsic viscosity (measured in N—methyl pyrrolidone at (30° C.) (6) | 1.5 dl/g |
| particle size (by light transmission) (7) | 0.33 microns |

Notes:
(6) In measuring the intrinsic viscosity, a 1 ml sample of the polymer emulsion is added to 100 ml of N-methyl pyrrolidone, and the mixture is agitated and filtered. The flowtime of the solution so prepared is then compared at 30° C. with the flow time of the N-methyl pyrrolidone solvent using a Ubbelohde viscometer (obtained from the Cannon Instrument Company) the relative viscosity is the fraction obtained by dividing the flowtime of the solution by the flowtime of the solvent. The Huggins equation is then used to calculate the intrinsic viscosity from the relative viscosity measurement and from the polymer solids content in grams per 100 ml of solution. The use of the Huggins equation for intrinsic viscosity calculations is described in detail in the "Encyclopedia for Polymer Science and Technology", (Wiley, N.Y., 1971) Vol. 15, page 634.
(7) The particle size was measured by light transmission using a Beckman spectrophotometer (Spectronic 20). The method is described in detail in "Official Digest of the Paint and Varnish Industry", February 1959, pages 200-213.

EXAMPLE 2

A polymer emulsion is prepared containing a polymer which is an interpenetrating network of polyvinyl acetate and polymethyl methacrylate.

The following was charged to a 100 gal. (379 liter) stainless steel pilot reactor equipped with a variable agitator, temperature control system, feedpumps, means for purging the reactor with nitrogen, and a jacket for heating and cooling.

| | |
|---|---|
| Water | 140 lbs. (63.5 kg) |
| Triton X 305 (1) | 6 lbs. 10 oz. (3 kg) |
| Emcol K8300 (2) | 8 oz. (227 g) |

The contents of the reactor were heated to 67° C. after which the reactor was purged with nitrogen. After the heat-up and purge the following monomer was added to the reactor:

| | |
|---|---|
| Vinyl acetate | 26 lbs. (11.8 kg) |

This was followed by the addition of the initial catalyst solution:

| | |
|---|---|
| Water | 10 lbs. (4.5 kg) |
| Potassium persulfate | 8 oz. (227 g) |

The polymerization initiated within 5 minutes as indicated by a 2° C. rise in temperature of the reactor. The following first monomer emulsion, made up previously, was then added gradually by means of an additional pump at a rate of 1.56 lbs. (0.71 kg)/minute over a 3½ hour period:

| | |
|---|---|
| Water | 58 lbs. (26.3 kg) |
| Emcol K8300 (2) | 8 lbs. 8 oz. (3.9 kg) |
| Triton X 305 (1) | 2 lbs. 4 oz. (1.0 kg) |
| N—Methylol acrylamide (49%) | 19 lbs. (8.6 kg) |
| Acrylamide (50%) | 2 lbs. (0.9 kg) |
| Monoethylmaleate | 12 oz. (340 g) |
| JPS Sequesterent (5) | 5 oz. (142 g) |
| Vinyl acetate | 238 lbs. (108 kg) |
| Triallyl cyanurate | 5 oz. (142 g) |

The temperature of the reactor content was allowed to rise to 80° C. and was maintained there by the gradual addition at a rate of 0.362 lbs. (0.164 kg)/minute over a 3½ hour period of the following catalyst solution:

| | |
|---|---|
| Water | 75 lbs. (34 kg) |
| Potassium persulfate | 9 oz. (255 g) |

After 3½ hours, when all the first monomer emulsion and catalyst solution had been added to the reactor the following finishing catalyst solution was added:

| | |
|---|---|
| Water | 1 lb. (.45 kg) |
| Potassium persulfate | 1½ oz. (57 g) |

The temperature of the batch was maintained at 80° C. for an additional 30 minutes, after which the first polymer emulsion was cooled to 60° C. At this point a second monomer emulsion was introduced into the reactor as fast as possible, in about 10 minutes, and thoroughly mixed with the first polymer emulsion. The second monomer emulsion had been prepared before containing:

| Water | 50 lbs. (22.7 kg) |
|---|---|
| Emcol K8300 (2) | 3 lbs. (1.4 kg) |
| Triton X 305 (1) | 3 lbs. (1.4 kg) |
| N—Methylol acrylamide (49%) | 5 lbs. (2.3 kg) |
| Methyl methacrylate | 100 lbs. (45.4 kg) |
| Ferrous sulfate | 1 gram |

The temperature of the reactor content was maintained at 60° C. and allowed to equilibrate (about ½ hour), while the reactor was again purged with nitrogen after which the following catalyst solution was added to the reactor:

| Water | 19 lbs. (8.6 kg) |
|---|---|
| Potassium persulfate | 1 lb. (0.5 kg) |
| t-butyl hydroperoxide | 8 oz. (227 g) |

The second polymerization step was initiated by adding half of the following reducing solution:

| Water | 16 lbs. (7.3 kg) |
|---|---|
| Hydrosulfite AWC (3) | 6 oz. (170 g) |

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

| Water | 4 lbs. (1.8 kg) |
|---|---|
| Zinc nitrate solution in water 50% | 14 oz. (397 g) |
| Phosphoric acid | 7 oz. (198 g) | followed by a second post-add as follows:

| Water | 2 lbs. (0.9 kg) |
|---|---|
| Proxel GXL (4) | 1½ oz. (43 g) |
| Formaldehyde (37%) | 1½ oz. (43 g) |

A total of 60 lbs. (24.9 kg) of rinsewater was added to the emulsion for clean up of the pumps and lines.

The polymer emulsion thus obtained had the following properties:

| solids (30 min at 130° C. drying) | 45.0% |
|---|---|
| pH | 4.0 |
| viscosity (Brookfield at 50 RPM) | 32 cps |
| intrinsic viscosity (measured in N—methyl pyrrolidone at 30° C.) (6) | 2.3 dl/g |
| particle size (by light transmission) (7) | 0.27 microns |

EXAMPLE 3

A typical fiberfill product for quilt stuffing was constructed of 6 denier 2" staple length polyester fiber with garnetted and crosslapped webs to a weight of 4 oz.-/yd². This web was then spray bonded with a commercially available polyvinylacetate emulsion polymer (SUNCRYL RW 41SP from Sun Chemical Corporation), and the polymer emulsion as prepared in Examples 1 and 2, producing a final fiberfill product composed of 82% fibers and 18% bonding polymer.

The binder mix is prepared in a tank by diluting the emulsions with water to a 22% nonvolatile content. This mix is pumped with reciprocating airless pumps at a pressure of 300 psi and delivered through spray nozzles of 0.018 inch diameter which traverse the polyester fiber web. The polyester web is passed under the traversing sprays so as to achieve a uniform application of the bonding mix. The web and applied mix are passed through a forced air oven to remove the water and coalesce the binder polymer onto the fibers. The web is turned over and the process repeated on the back side. Finally the web is passed through the oven a third time to cure the binder, rendering it durable and resistant to water and solvent interactions.

The residual loft value was simulated by the following test. Ten inch by ten inch squares of the fiberfill material are cut and stacked vertically. The height of this stack is measured ($H_1$). The stack is then compressed by placing weights on top of the stack. A typical weight of 20 pounds usually reduces the initial stack height by 50 to 75%. The stack is left in this compressed state for a period of time (1 hour is typical) at a stated temperature and then the weight is removed. The stack of fiberfill is allowed to recover for a further period of time (10 minutes is typical) and the height is again measured ($H_2$). The % recovery is stated as a ratio of the final height to the initial height:

$$(H_2/H_1) \times 100 = \% \text{ recovery}$$

Table 1 shows % recovery values of a 6 layer stack compressed with 0.2 psi (20 lbs. on a 10"×10" square) for 16 hours and then allowed to recover for 1 hour at the stated temperatures.

TABLE 1

| | Polyvinyl acetate | Example 2 | Example 1 |
|---|---|---|---|
| 72° F. | 85% | 85% | 85% |
| 110° F. | 37% | 46% | 59% |

Although all the binders are affected by temperature, the polyvinyl acetate bonded fiberfill loses more loft at 110° F.

EXAMPLE 4

A more detailed study was made of the binder utilizing the polymer emulsion prepared in Example 1 on a slightly different fabric, a 50/50 blend of 6 and 15 denier polyester. Web preparation and bonding were similar to Examples 3. Finished fiberfill weight for this furniture pad material was 18 oz./yd² with a fiber content of 81% and a binder content of 19%.

The same loft recovery test was conducted at 120° F. with compression for 6 hours under various compression loads and recovery measured both immediately and after 6 hours. Again the polymer of Example 1 shows considerably more loft recovery at this temperature under all compression loads as compared to a binder utilizing a polyvinyl acetate emulsion polymer (PVAc) as shown in Table 2.

TABLE 2

| Compression Loading | 0.02 psi | | 0.05 psi | | 0.15 psi | |
|---|---|---|---|---|---|---|
| polymer type | PVAc | Example 1 | PVAc | Example 1 | PVAc | Example 1 |

TABLE 2-continued

| Compression Loading | 0.02 psi | | 0.05 psi | | 0.15 psi | |
|---|---|---|---|---|---|---|
| immediate recovery | 69% | 77% | 55% | 68% | 14% | 27% |
| 6 hour recovery | 69% | 80% | 58% | 70% | 16% | 29% |

EXAMPLE 5

An ethylene-vinyl acetate copolymer emulsion was prepared. The following was charged to a 10 gal. Stainless steel pressure reactor equipped with a variable agitator, temperature control system, feedpumps, means for purging the reactor with nitrogen and pressurizing with ethylene, and an internal coil for heating and cooling:

| Water | 9250 g |
|---|---|
| Triton X 405 (8) | 120 g |
| Triton X 100 (9) | 85 g |
| Ferrous sulfate | 0.2 g |

The contents of the reactor were heated to 40° C., the reactor was purged with nitrogen once, and then the reactor was pressurized with ethylene to 800 psi. After the heat-up, purge and pressurization, 1000 g of the following monomer emulsion, made up previously, was added to the reactor:

| Water (deionized) | 2600 g |
|---|---|
| Emcol K8300 (2) | 100 g |
| Triton X 405 (8) | 220 g |
| Triton X 100 (9) | 150 g |
| N—Methylol acrylamide (49%) | 565 g |
| Acrylamide (50%) | 565 g |
| Sodium persulfate | 46 g |
| Vinyl acetate | 7700 g |
| Triallyl cyanurate | 12 g |

This was followed by the addition of the following initial catalyst solution:

| Water (deionized) | 385 g |
|---|---|
| Sodium persulfate | 38 g |

The polymerization was initiated by adding an activator solution at a rate of 1.25 g/min as follows:

| Water (deionized) | 420 g |
|---|---|
| Hydrosulfite AWC (3) | 25 g |

The polymerization initiated within 5 minutes as indicated by a rise in the reactor temperature. The rest of the monomer emulsion was then added gradually by means of an addition pump at a rate of 30 g/minute over a 3 hour period. The temperature of the reactor content was allowed to rise to 60° C. and was maintained there by the addition of the above mentioned activator solution as needed. At this point the ethylene pressure rose to 900 psi and was maintained there by setting the ethylene supply valve to 900 psi. A total of 445 g of the activator solution was used.

After 3 hours, when all the monomer emulsion and activator solution had been added to the reactor the following finishing catalyst solution was added:

| Water (deionized) | 77 g |
|---|---|
| Sodium persulfate | 8 g |
| t-butyl hydroperoxide | 7.5 g |
| Triton X 405 (8) | 2 g | followed by addition of the following finishing activator solution:

| Water (deionized) | 77 g |
|---|---|
| Hydrosulfite AWC (3) | 8 g |

The temperature of the batch was maintained at 60° C. for an additional hour after which the free vinyl acetate monomer concentration had fallen below 1%. The polymer emulsion was then cooled to 30° C. and the ethylene vented from the reactor to ambient pressure. The emulsion had the following properties:

| solids (30 min at 130° C. drying) | 42.1% |
|---|---|
| pH | 5.85 |
| viscosity (Brookfield at 50 RPM) | 142 cps |
| intrinsic viscosity measured in N—methyl pyrrolidone at (30° C.) (6) | 0.8 dl/g |
| particle size (by light transmission) (10) | 0.14 microns |
| ethylene content of the copolymer | 18.5% solids by weight |

Notes:
(8) Triton X 405 is a 70 percent solution in water of an octylphenoxypolyethoxyethanol containing 30 moles of oxyethanol per mole of octyl phenol. It is supplied by the Rohm & Haas Company.
(9) Triton x 100 is an octylphenoxypolyethoxyethanol containing 10 moles of oxyethanol per mole of octylphenol. It is supplied by the Rohm & Haas Company.
(10) The particle size was measured by light transmission using a Coulter Counter.

EXAMPLES 6-9

In the following examples an interpenetrating network containing varying amounts of vinyl acetate-ethylene copolymer (from Example 5) with polystyrene was prepared.

The following was charged to a 1 liter glass reactor equipped with a variable agitator, temperature control system, feedpumps, and a water bath for heating and cooling:

| | Examples | | | |
|---|---|---|---|---|
| | 6 | 7 | 8 | 9 |
| Vinyl acetate-ethylene copolymer (Ex. 5) | 290.1 g | 250.9 g | 250.9 g | 205.3 g |
| Water (deionized) | 9.7 g | 23.1 g | 44.3 g | 54.6 g |
| Emcol K8300 (2) | 0.4 g | 0.8 g | 1.4 g | 1.8 g |
| Triton X 305 (1) | 0.4 g | 0.8 g | 1.4 g | 1.8 g |
| N—Methylol acrylamide (49%) | 0.7 g | 1.4 g | 2.4 g | 3.0 g |
| Styrene | 13.9 g | 27.8 g | 47.7 g | 60.6 g |
| Divinyl benzene | 0.015 g | 0.025 g | 0.05 g | 0.06 g |
| Potassium persulfate | 0.15 g | 0.3 g | 0.5 g | 1.3 g |
| t-Butyl hydroperoxide | 0.07 g | 0.2 g | 0.3 g | 0.4 g |

The batch was heated to 55° C., and allowed to equilibrate for 15 minutes, after which the following activator solution was added:

|  | 6 | 7 | 8 | 9 |
|---|---|---|---|---|
| Water (deionized) | 2.2 g | 4.7 g | 8.1 g | 10.3 g |
| Hydrosulfite AWC (3) | 0.06 g | 0.1 g | 0.2 g | 0.25 g |

After leaving the batch at 57° C. for 2.5 hours the above activator charge was repeated. The batch was then cooled to room temperature. The interpenetrating network containing emulsions had the following properties:

|  | 6 | 7 | 8 | 9 |
|---|---|---|---|---|
| % vinyl acetate-ethylene copolymer | 90 | 80 | 70 | 60 |
| % polystyrene | 10 | 20 | 30 | 40 |
| solids (30 min at 130° C. drying) | 44.0% | 45.2% | 42.6% | 38.7% |
| pH | 4.7 | 5.1 | 5.5 | 6.2 |
| viscosity (Brookfield at 50 RPM) | 165 cps | 237 cps | 264 cps | 277 cps |
| intrinsic viscosity (measured in N—methyl pyrrolidone at 30° C.) (6) | 0.64 dl/g | 0.82 dl/g | 0.80 dl/g | 0.78 dl/g |
| particle size (by light transmission) (10)-microns | 0.14 | 0.16 | 0.19 | 0.28 |
| free styrene | 0.02% | 0.6% | 0.5% | 0 |

EXAMPLE 10

One widely used test for evaluating the strength given to a nonwoven by an emulsion polymer treatment is the TAPPI Useful Method 656. This method is a saturation treatment and the information obtained can be translated to other nonwoven treatment methods like print bonding, spray bonding, wet-end coacervation, etc. The new copolymer emulsions were evaluated in TAPPI UM 656 using the following specifications and modifications to the method: All emulsions were run at a pH of 4; emulsion solids were adjusted to provide a 20% dry add-on when padded through an Atlas Laboratory Wringer LW-1; the treated nonwoven (Whatman filter paper) was then dried and cured at 150° C. for 5 minutes in an AHIBA-Mathis forced air oven type LTF; the strength and elongation of the treated nonwovens were determined on both dry and wet (after a 3 minute soak in a 1% Aerosol OT-75 solution) fabrics with an INSTRON Model 1130 tester (gage length 2.5 cm with extension rate of 5 cm/min); and the values reported are an average of 5 determinations.

In the following Table: A is an 80%/20% blend of the vinyl acetate-ethylene copolymer of Example 5 with polystyrene; B is a 60%/40% blend of vinylacetate-ethylene copolymer (Ex. 5) with polystyrene; and C is a commercial acrylate ester copolymer (Rhoplex HA-12 from Rohm and Haas Company) which is used to bond polyester and rayon staple fibers.

|  | Ex. 5 | Ex. 7 | A | Ex. 9 | B | C |
|---|---|---|---|---|---|---|
| Dry Strength | 6.7 | 8.1 | 7.6 | 9.2 | 8.1 | 8.4 |
| Wet Strength | 3.4 | 4.1 | 3.3 | 4.2 | 3.8 | 4.1 |

This examples shows that the second polymerization of styrene in the vinylacetate-ethylene copolymer enhances the strength of the potential nonwoven binder. Although simple blend systems of polystyrene and the vinylacetate-ethylene copolymer show an increased strength with polystyrene content, the interpenetrating network (IPN) systems show an even greater increase in strength. An all acrylic latex (C) of similar stiffness to the 60/40 IPN of Example 9 gave a strength value midway between the blend (B) and the 60/40 IPN of Example 9.

EXAMPLE 11

In order to demonstrate the suitability of the interpenetrating network (IPN) polymers in bonding other types of nonwoven fabrics, a 0.5 oz./yd$^2$ polyester staple fiber sheet made from DuPont Type 371 54w Merge number 113 D93 (a 1.5 inch-1.5 denier fiber) was saturation bonded with various polymers.

When padded in an Atlas Laboratory Wringer LW-1 to achieve an add-on of 35% by weight, the following tensile strength results were obtained in grams per inch of width.

|  | Example 5 | Example 8 | Example 9 |
|---|---|---|---|
| Dry Strength | 396 | 405 | 478 |
| Wet Strength | 148 | 210 | 223 |

Although this substrate is considerably more variable than the substrate used in TAPPI UM656 in Example 10, the effect of a second polymerization of styrene to form an interpenetrating network with a vinylacetate-ethylene copolymer is to increase nonwoven strength. More importantly the example demonstrates that a variety of nonwoven products can be prepared with the IPN polymer emulsion.

EXAMPLE 12

Still other nonwovens are fully useful fabrics without an emulsion polymer treatment. A classic example is a needle punched filament polyester fabric which is used for geotextile applications, and industrial fabrics. However, this material, per se, is not able to be used for many applications; such as saturation with not asphalt, because it stretches too much when under tension in the 350° F. asphalt bath. Such a fabric can be treated with the IPN polymer emulsion to increase the interfiber bond strength and reduce the stretch in the hot asphalt bath.

The suitability of the IPN polymer emulsion and the improvement offered over a traditional polymer emulsion were evaluated in a typical high temperature stretch test. A filament polyester mat which had been needle punched was saturated with various latexes to achieve a dry binder add-on of 22% by weight. The finished fabric weight was 204 g/m$^2$. After padding on a Butterworth 2 roll padder, 1 dip-1 nip, the fabrics were dried and cured at 400° F. for 3 minutes in an AHIBA-Mathis LTF forced oven. High temperature stretch was evaluated at two tension levels. Tension was developed in a constant elongation device-INSTRON Model 1130. Two by six inch (six inches in machine direction) samples were used with a gage length of 10 cm and a jaw separation rate of 10 cm/min., and a chart speed of 50 cm/min. All tests were conducted in an environmental cabinet with a temperature of 180° C. The sample and cabinet were allowed to equilibrate one minute after entering the test sample and after the cabinet returned to 180° C. The extension of the sample was recorded when the tension reaches the 5000 and 8000 gram levels.

The performance of a polyvinylacetate polymer emulsion (represented by SUNCRYL RW41SP which is sold by Sun Chemical Corporation) can be improved by a second stage polymerization forming an IPN with methyl methacrylate (see Example 2). Suncryl SA 220 is a traditional styrene-butylacrylate copolymer (sold by Sun Chemical Corporation) with a hardness value similar to Suncryl RW 41SP and the IPN of Example 2.

| | 180° C. Stretch - % of Initial Length | | | |
|---|---|---|---|---|
| | Untreated | SUNCRYL (RW 41SP) | SYNCRYL (SA 220) | Example 2 |
| 5000 gm load | 14.3 | 8.8 | 20.8 | 6.1 |
| 8000 gm load | 19.5 | 27.9 | 37.3 | 14.3 |

The above table shows that the second stage polymerization forming an IPN can dramatically alter the stretch performance of a basic nonwoven fabric.

EXAMPLE 13

A glass fiber mat without binder is prepared as follows:

(1) 2.8 grams of type M glass fiber of 16 micron diameter and 1.25 inch staple length are mixed in 300 ml. of water;

(2) The fiber slurry is mixed 1 minute in a commercial Waring blender;

(3) Separately a polyester scrim fabric (40×40 mesh-/in.$^2$) is treated with a silicone release coating made with a bath of 12% Norane Silicone (30% solids emulsion of methyl hydrogen polysiloxane) and 3% Catalyst EC (20% solids dispersion of zinc stearate) and cured for 2 minutes at 340° F.;

(4) A 9"×18" scrim is placed in a Noble & Wood paper hand sheet former and the unit is closed;

(5) 10,000 mls of water and 10 mls of 10% Katapol PN-430 (polyoxyethylated alkylamine from GAF Corporation) solution is added with mixing;

(6) The fiberglass slurry is added and mixed; and (7) This diluted slurry is then dropped through the scrim forming the unbonded glass fiber mat.

Aqueous bonding solutions are traditionally prepared by reducing a commercial U-F (urea-formaldehyde) binder from its supplied strength (55%) to 30% nonvolatile content or, if being tested, mixing with an appropriate thermoplastic emulsion copolymer prior to dilution to 30% solids. These bonding solutions are simple mixtures conducted under agitation at room temperature. These mixtures are then further reduced to 4% solids with agitation just prior to immersing the glass mat to be treated.

Other glass mat products require different binding systems. The use of urea-formaldehyde binders has been the historical bonding system for glass mat for shingle roofing substrate or for built-up roofing fabrics. Urea-formaldehyde resins have been used for these fabrics but exhibit some deficiencies:

(1) The fabrics are too brittle, causing breakouts in production;

(2) These fabrics are not flexible and cause breakage in roofing installation;

(3) U-F bonded glass mats are high in tensile strength but lack overall toughness; and (4) U-F bonded glass mats lose strength when exposed to water One way to overcome these deficiencies in U-F bonded glass mats for roofing products is to include a thermoplastic polymer as a portion of the regular U-F glass binder. The thermoplastic polymer modifies the U-F resin's brittleness and, more importantly, greatly increases the mat's strength when exposed to heat and moisture.

The following procedures describe the preparation and testing of glass fiber nonwoven mats suitable for roofing fabrics (both for shingle and for BUR, built up roofing, applications). The glass fiber mats bonded with a U-F resin (55% solids) were compared to mats bonded with U-F and various emulsion polymers.

| | Wet Weight | Dry Weight |
|---|---|---|
| U-F resin | 55 grams | 30 grams |
| Emulsion polymer | 21.4 grams | 10 grams |
| Water | 923.6 grams | 0 grams |
| | 1000 grams | 40 grams |

Note that the IPN polymer emulsion represents 25% of the total dry binder content in this Example.

This glass fiber mat was bonded with 20% by weight dry add-on of binder. The following procedure was used:

(1) The bonding bath was prepared, reduced to 4% solids, and placed in an open pan (conveniently 1000 mls of bonding solution in a 11×16×1 inch pan);

(2) The glass mat sandwiched between layers of scrim was immersed in the bonding solution;

(3) The mat was removed and blotted to 225–250% wet pick-up (pick-up was based on the total scrim plus fiber glass mat weight);

(4) The mat with scrims still intact was dried and cured 3 minutes at 300° F.; and (5) The scrims were then peeled away leaving an integrally bonded glass mat fiber The following items are recorded through this process:

A. original scrim weight
B. scrim with unbonded glass mat weight
C. final scrim with bonded glass mat weight $$\% \text{ binder} = \frac{C - A}{B - A} \times 100^{-1}$$

These bonded glass mats were then tested in an appropriate evaluation series including wet and dry tensile strength in TAPPI Method UM 656 (4 inch gauge length) and tear strength in ASTM Method D-689. Since all bonding mixes are aqueous, the bonding ingredients are based on soluble U-F resins and emulsion polymer products.

A commercially used U-F resin was used alone and blended with a commercial acrylate ester emulsion polymer (Rhoplex GL655 sold by Rohm and Haas), a styrene-acrylic emulsion copolymer (Suncryl SA-220), a polyvinylacetate emulsion copolymer (Suncryl RW 41SP) and the polyvinylacetate-styrene interpenetrating network (IPN) polymer emulsion of Example 1. All the thermoplastic components had polymer Tg's in the 25°–50° C. range.

The U-F resin provides a standard for comparison:

|  | Dry tensile | | 4.2 + 1.3 | |
|---|---|---|---|---|
|  | Wet tensile | | 2.7 + .9 | |
|  | % Wet/Dry | | 64% | |
|  | Tear strength | | 285 | |
|  | UF Resin with | | | |
|  | Rhoplex GL 655 | SUNCRYL SA-220 | SUNCRYL RW 41SP | IPN Polymer Of Example 1 |
| Dry | 4.6 ± 1.5 | 6.0 ± 1.6 | 5.5 ± 1.4 | 5.9 ± 1.7 |
| Wet | 5.1 ± 2.8 | 4.5 ± 2.4 | 2.9 ± .2 | 5.4 ± 1.3 |
| % Wet/Dry | 111% | 75% | 53% | 92% |
| Tear | 483 | 371 | 427 | 461 |

These results show that adding thermoplastic copolymers to the U-F resin improves the dry and wet tensile and the tear strength of the glass fiber mats.

The single most important measure of glass mat performance is wet tensile strength. This correlates well with higher Tg copolymers with hydrophobic character. The traditional copolymers show increasing wet strength in the order: (1) vinylacetate copolymer; (2) styrene-butyl acrylate copolymer; and (3) methylmethacrylate-ethylacrylate copolymer. The vinylacetate-styrene interpenetrating network copolymer showed an even better wet strength performance. These two monomers have not previously been combined in a single IPN copolymer system for bonding glass mat nonwovens. Such an IPN copolymer demonstrates a valuable utility in providing adequate glass mat performance properties in a lower cost copolymer composition when compared to styrene-acrylic or all acrylic copolymers.

What is claimed is:

1. A nonwoven product comprising a fiber or fabric bound by a binder comprising an aqueous polymer emulsion containing a first polymer network containing an active crosslinking agent which is intertwined on a molecular scale with a second polymer network, wherein the second polymer differs from the first polymer and the first polymer comprises 5 to 95% on a solids by weight basis of the emulsion.

2. Product of claim 1 wherein the fiber is made from a composition chosen from the group consisting of glass, rayon, cotton, nylon, polyester, graphite and wood.

3. Product of claim 1 wherein the polymer of the first polymer network is chosen from the group consisting of polymethyl methacrylate, polyvinyl acetate, polystyrene, polybutylacrylate, vinylchloride-ethylene copolymer, vinylacetate-ethylene copolymer, polyacrylonitrile and copolymers thereof.

4. Product of claim 3 wherein the polymer of the second polymer network is chosen from the group consisting of polyacrylo-nitrile, polymethyl methacrylate, polybutylacrylate, polystyrene and copolymers thereof.

5. Product of claim 1 wherein the monomers of the first polymer and second polymer cannot be copolymerized.

6. Product of claim 1 wherein the first polymer network contains a polymer selected from the group of polyvinyl acetate and vinylacetate-ethylene copolymer and the second polymer network is selected from the group consisting of polystyrene and polymethyl methacrylate.

7. Product of claim 6 wherein the first polymer network contains a vinyl acetate-ethylene copolymer.

8. Product of claim 4 wherein the first polymer comprises 30 to 90% and the second polymer comprises 10 to 70% on a solids by weight basis of the emulsion.

9. Product of claim 1 wherein the nonwoven product is chosen from the group consisting of insulation, filters, construction fabrics, roofing materials, paper towels, carpets and other nonwoven fabrics.

10. Product of claim 1 wherein the binder further comprising thermosetting resins.

11. A glass fiber nonwoven mat bound by a binder comprising an aqueous polymer emulsion containing a first polymer network containing an active crosslinking agent which is intertwined on a molecular scale with a second polymer network, wherein the second polymer differs from the first polymer and the first polymer comprises 5 to 95% on a solids by weight basis of the emulsion.

12. Product of claim 11 wherein the polymer of the first polymer network is chosen from the group consisting of polymethyl methacrylate, polyvinyl acetate, polystyrene, polybutylacrylate, vinylchloride-ethylene copolymer, vinylacetate-ethylene copolymer, polyacrylo nitrile and copolymers thereof.

13. Product of claim 12 wherein the polymer of the second polymer network is chosen from the group consisting of polyacrylo nitrile, polymethyl methacrylate, polybutylacrylate, polystyrene and copolymers thereof.

14. Product of claim 11 wherein the monomers of the first polymer and second polymer cannot be copolymerized.

15. Product of claim 11 wherein the first polymer network contains a polymer selected from the group of polyvinyl acetate and vinylacetate-ethylene copolymer and the second polymer network is selected from the group consisting of polystyrene and polymethyl methacrylate.

16. Product of claim 15 wherein the first polymer network contains a vinyl acetate-ethylene copolymer.

17. Product of claim 13 wherein the first polymer comprises 30 to 90% and the second polymer comprises 10 to 70% on a solids by weight basis of the emulsion.

18. Product of claim 11 wherein the binder further comprises thermosetting resins.

* * * * *